(12) United States Patent
Jayaram et al.

(10) Patent No.: US 7,682,029 B2
(45) Date of Patent: Mar. 23, 2010

(54) SYSTEM AND METHOD FOR PROJECTOR LAMP DOOR THERMAL SAFETY LATCH

(75) Inventors: Subramanian Jayaram, Austin, TX (US); Samuel Nicklaus D'Alessio, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 703 days.

(21) Appl. No.: 11/554,903

(22) Filed: Oct. 31, 2006

(65) Prior Publication Data
US 2008/0100808 A1    May 1, 2008

(51) Int. Cl.
G03B 21/20 (2006.01)
G03B 21/00 (2006.01)
G03B 21/14 (2006.01)
G03B 21/16 (2006.01)
G03B 21/18 (2006.01)
G03B 21/22 (2006.01)

(52) U.S. Cl. .............................. 353/87; 353/52; 353/85; 353/119; 353/122

(58) Field of Classification Search ................... 353/85, 353/87, 119, 122, 52; 267/185, 158
See application file for complete search history.

(56) References Cited

U.S. PATENT DOCUMENTS

| | | | | |
|---|---|---|---|---|
| 3,626,712 A | * | 12/1971 | Mann et al. | 62/161 |
| 3,815,942 A | * | 6/1974 | White | 292/113 |
| 4,015,869 A | * | 4/1977 | Horvath | 292/341.16 |
| 4,927,049 A | * | 5/1990 | Giordano | 220/201 |
| 5,220,153 A | * | 6/1993 | Malone et al. | 219/412 |
| 5,287,132 A | | 2/1994 | Suzuki et al. | 353/119 |
| 5,347,324 A | | 9/1994 | Sasaki et al. | 348/789 |
| 6,003,909 A | * | 12/1999 | Daoud | 292/180 |
| 6,293,598 B1 | * | 9/2001 | Rusiana | 292/143 |
| 6,472,828 B1 | * | 10/2002 | Pruett et al. | 315/225 |
| 6,853,152 B2 | | 2/2005 | Pruett et al. | 315/219 |
| 7,517,112 B2 | * | 4/2009 | Miletich et al. | 362/269 |
| 2004/0234311 A1 | * | 11/2004 | Adams | 399/380 |
| 2005/0146688 A1 | * | 7/2005 | Takemi | 353/87 |
| 2005/0213441 A1 | * | 9/2005 | Voltz | 369/30.36 |

FOREIGN PATENT DOCUMENTS

| | | | |
|---|---|---|---|
| JP | 05088261 A | * | 4/1993 |
| JP | 2002333668 A | * | 11/2002 |

\* cited by examiner

*Primary Examiner*—Georgia Y Epps
*Assistant Examiner*—Jori S Byrne-Diakun
(74) *Attorney, Agent, or Firm*—Hamilton & Terrile, LLP; Robert W. Holland

(57) ABSTRACT

An information handling system projector lamp door includes a thermal safety latch that secures the lamp cover panel if the temperature of the projector interior exceeds a safety limit associated with potential harm to an end user. A thermostatic spring expands at a predetermined temperature to interfere with movement of a latch so that the latch is locked to secure the cover panel in a closed position. Below the predetermined temperature, the thermostatic spring retracts to allow movement of the latch so that the cover panel is released to move to an open position. An override interfaces with the thermal safety latch to allow manual release of the cover panel by retracting the thermostatic spring.

15 Claims, 2 Drawing Sheets

SYSTEM AND METHOD FOR PROJECTOR LAMP DOOR THERMAL SAFETY LATCH

BACKGROUND OF THE INVENTION

1. Field of the Invention

The present invention relates in general to the field of information handling system projector displays, and more particularly to a system and method for a projector lamp door thermal safety latch.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present visual images through a peripheral display device. With information handling systems finding increasing use as entertainment tools, such as for watching movies or playing games, high quality display presentations have become of greater interest to end users. Display devices with relatively high resolution are generally able present larger images while maintaining good visual quality. One example of a high resolution display that presents a high quality image is the projector. Projectors receive visual information from information handling systems through standardized interfaces, such as through a DVI or VGA cable, and generate images with an internal transparent device, such as a liquid crystal display. A high intensity light is passed through the transparent device and focused at a point distal from the projector to present the image. For example, arc lamps are often used in projectors to provide an intense and bright light source to illuminate the visual image. Projector lamps are periodically replaced as their brightness intensity diminishes with use. For example, the lamp is integrated in a housing sized to fit into a cavity of the projector so that lamps are changed by releasing an existing housing and inserting a new housing. The lamp housing cavity formed in the projector housing is typically covered by a panel to provide protection to the lamp and end users of the projector.

One difficulty with projectors is that the arc lamps typically needed to get a quality visual presentation generate a considerable amount of heat as a byproduct of illumination of an image. Generally, the cover panel over the lamp housing cavity protects end users from direct contact with a heated lamp. However, a heated lamp or lamp housing presents a hazard to end users when a lamp housing is changed, such as when a lamp burns out or offers insufficient illumination. Some projectors reduce the risk of a heated lamp to an end user by requiring the use of tools to remove the lamp cover and/or the lamp housing. Essentially, by making removal of the lamp more difficult, end users are discouraged from changing the lamp and are given a built-in cool down time for the lamp to cool while the tools are located and used. Nonetheless, a risk of an end user receiving a burn from a heated lamp can remain for a considerable time so that the delay introduced by the use of tools does not provide a guarantee against an inadvertent end user injury.

SUMMARY OF THE INVENTION

Therefore a need has arisen for a system and method which provides protection against heat injuries to end users during removal of a projector lamp.

In accordance with the present invention, a system and method are provided which substantially reduce the disadvantages and problems associated with previous methods and systems for protecting against heat injuries to end users during removal of a projector lamp. A projector thermal safety latch secures a cover panel to the projector's housing to prevent end user access to the projector interior if the interior has a predetermined temperature.

More specifically, a projector illuminates an image with a lamp to present the image at a distal screen. The projector's housing encases the lamp within a cavity having an opening that allows access to the lamp, such as for changing the lamp. A lamp door cover panel covers the opening to prevent access to the lamp during operation of the projector. A latch coupled to the cover panel secures the cover panel in a closed position and manually activates to release the cover panel for movement to an opened position that exposes the interior of the projector housing proximate the lamp. A thermal safety associated with the cover panel locks the latch to prevent opening of the cover panel if the projector interior proximate the lamp exceeds a predetermined amount, such as a lamp temperature associated with potential end user harm. For example, a thermostatic spring extends at the predetermined temperature to interfere with latch movement to lock the latch with the cover panel in the closed position. An override associated with the thermal safety allows manual selection to open the latch, such as by forcible retraction of the thermostatic spring.

The present invention provides a number of important technical advantages. One example of an important technical advantage is that a projector lamp cover panel is automatically secured in a closed position if the temperature proximate the lamp exceeds a predetermined amount. Once the temperature proximate the lamp drops below the predetermined amount, the lamp cover panel is automatically unsecured so that an end user can selectively unlatch and remove the cover panel. Securing the lamp cover panel when temperatures exceed safe limits reduces the risk that an end user will remove the cover panel and suffer a heat injury. Further, tool-less removal of the lamp cover reduces the inconvenience to end users in accessing the lamp without increasing the risk of injury due to inadvertent opening of the cover panel.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Presenting visual images from an information handling system through a projector has improved safety where a thermal safety prevents exposure to a projector lamp when the lamp is hot. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
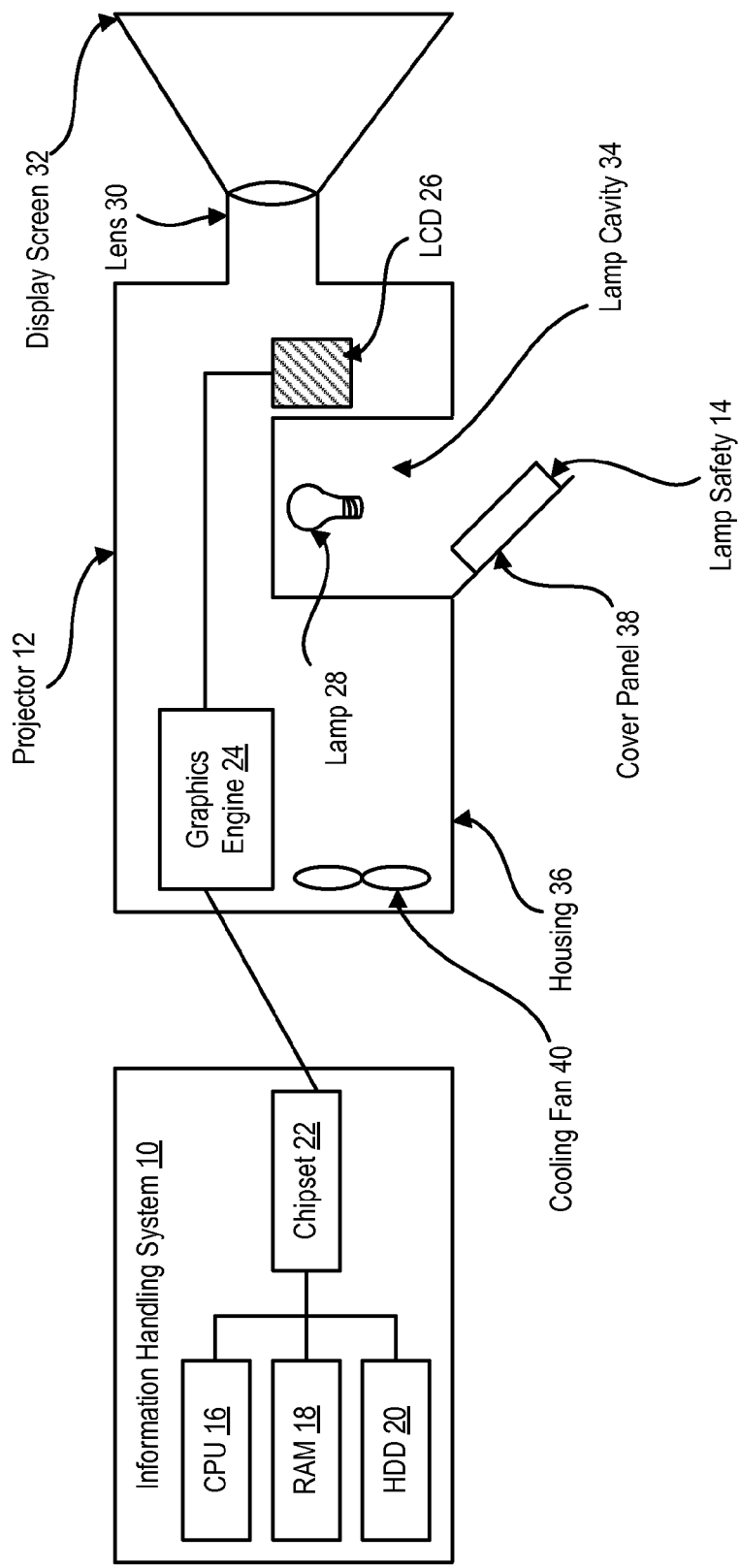
FIG. 1 depicts a block diagram of an information handling system presenting images through a projector having a thermal safety.

Referring now to FIG. 1, a block diagram depicts an information handling system 10 presenting images through a projector 12 having a thermal safety 14. Information handling system 10 has plural processing components that cooperate to generate visual information, such as a CPU 16, RAM 18, a hard disk drive 20 and a chipset 22. The visual information is communicated to a graphics engine 24 of projector 12, which converts the visual information to an image at an LCD 26. The image presented at LCD 26 is illuminated by a lamp 28, such as an arc lamp, which projects the image through a lens 30 to a distal display screen 32. Lamp 28 is maintained in a lamp cavity 34 formed in the housing 36 of projector 12. Access to lamp cavity 34 is provided so that an end user can change lamp 28 if the lamp burns out or becomes dim. For example, a cover panel 38 hinges as a door to provide access to lamp cavity 34 by rotating to an open position as depicted. Cover panel 38 rotates to a closed position that encloses lamp 28 in lamp cavity 34 and prevents end user access to lamp 28. For example, operation of projector 12 is sometimes prohibited if cover panel 38 is not in a closed position to help reduce the risk of electric shock to an end user from the high voltage power source used to light lamp 28.

Lamp 28 tends to generate considerable heat as a by-product of the illumination of an image. Often, projector 12 includes a cooling fan 40 to remove the excess heat. The amount of heat generated by lamp 28 can create temperatures within lamp cavity 34, such as the physical structure that supports lamp 28, that exceed levels that end users can handle without risk of heat-related injury. To reduce the risk of injury to an end user, a thermal safety associated with cover panel 38 keeps cover panel 38 in a closed position if the temperature exceeds a predetermined safety threshold. An end user who attempts to open cover panel 38 when the temperature exceeds a safe amount is precluded from moving cover panel 38 until the temperature decreases to a safe level. Once the temperature lowers below the safety threshold, thermal safety 14 permits movement of cover panel 38 to an open position so that an end user can access lamp 28, such as to change an old lamp with a new lamp. Thermal safety determines temperature in a variety of ways and engages a lock to prevent opening of cover panel 38 if the temperature is excessive. For example, operation of cooling fan 40 within projector 12 can be used to indicate an excessive temperature, or measurements of the interior temperature proximate cavity 34 can be accessed by thermal safety 14 to engage and disengage a lock at cover panel 38 at specified temperatures. Alternatively, a mechanical thermal safety 14 can lock and unlock cover panel 38 based on the expansion of thermally-sensitive components.

Figure 2:
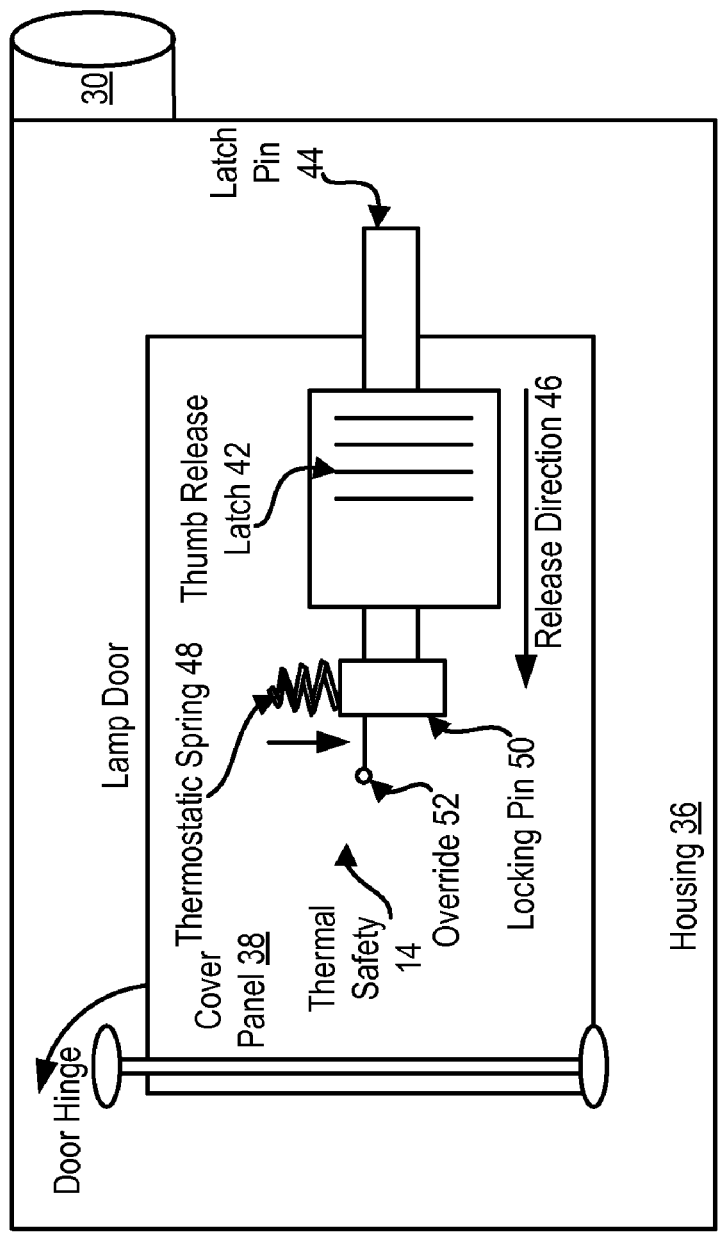
FIG. 2 depicts a block diagram of one embodiment of a projector door cover panel having a thermal safety.

Referring now to FIG. 2, a block diagram depicts one embodiment of a projector door cover panel having a thermal safety. A mechanical thermal safety 14 prevents movement of cover panel 38 by interfering with operation of a thumb release latch 42 if the temperature in the interior of projector 12 is excessive. Thumb release latch 42 engages a latch pin 44 into housing 36 to secure cover panel 38 in a closed position. An end user releases cover panel 38 by pressing thumb release latch 42 in release direction 46. Thermal safety 14 locks thumb release latch 42 in the secured position by preventing movement in release direction 46. A thermostatic spring 48 expands as the proximate temperature increases so that, at a predetermined temperature, a locking pin 50 interferes with operation of thumb release latch 42 so that latch pin 44 stays engaged with housing 36. As the temperature proximate thermostatic spring 48 decreases below the predetermined temperature, spring 48 retracts locking pin 50 to allow normal movement of thumb release latch 42. An override 52 couples to locking pin 50 to allow manual movement of locking pin 50 so that thumb release latch 42 is free to move even if the temperature exceeds the safety threshold. For example, override 52 is a pin hole similar that found in optical drives to manually open a bay door.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to generate visual information for presentation at a projector;
   a projector interfaced with the processing components and operable to present the visual information, the projector having a housing, a lamp disposed in the housing, and a cover panel disposed in housing proximate the lamp, the cover panel operable to selectively move to an open position that exposes the lamp and a closed position that covers the lamp;
   a thermal safety operable to secure the cover panel in the closed position if the lamp has a predetermined temperature; and
   a latch associated with the cover panel, the latch operable to move to a locked position that secures the cover in the closed position and an unlocked position that allows the cover to move to the open position, the thermal safety securing the cover panel in the closed position if the lamp has a predetermined temperature by securing the latch in the locked position.

2. The information handling system of claim 1 wherein the thermal safety comprises a spring lock having a spring that expands at the predetermined temperature to interfere with selection of the latch unlocked position.

3. The information handling system of claim 1 further comprising an override mechanism operable to override the thermal safety to unsecure the cover panel if the lamp has the predetermined temperature.

4. A method for managing access to the interior of a projector, the method comprising:
   determining that a temperature associated with the projector interior exceeds a predetermined amount; and
   securing a cover panel having access to the projector by actuating a latch to a closed position, preventing movement of the panel to an open position, and securing the latch in the closed position if the temperature exceeds the predetermined amount.

5. The method of claim 4 further comprising:
   determining that the temperature associated with the projector is less than the predetermined amount; and
   releasing the cover panel to allow movement to the open position.

6. The method of claim 5 further comprising activating a latch to move the panel to the open position.

7. The method of claim 4 wherein securing a cover panel further comprises:
   engaging a lock against the latch to prevent movement of the latch, the latch operable to keep the cover panel in the closed position and to release the cover panel to allow movement to the open position.

8. The method of claim 7 wherein engaging a lock further comprises:
   aligning a spring proximate the latch, the thermostatic spring interfering with movement of the latch when the temperature exceeds the predetermined temperature.

9. The method of claim 5 wherein the cover panel comprises a cover panel to cover a lamp cavity of the housing and the temperature comprises the temperature proximate the lamp cavity.

10. The method of claim 5 further comprising:
    overriding the securing of the cover panel to allow movement of the panel to an open position when the projector interior exceeds the predetermined temperature amount.

11. A system for managing access to the interior of a projector, the system comprising:
    a latch operable to move selectively to secure and release a cover panel, the cover panel moving between a closed position that prevents access to the projector and an open position that allows access to the projector; and
    a thermal safety associated with the latch, the thermal safety keeping the latch secure if the interior has a predetermined temperature.

12. The system of claim 11 wherein the thermal safety comprises:
    a spring operable to expand a predetermined amount at the predetermined temperature; and
    a locking pin coupled to the spring, the locking pin positioned to interfere with the latch when the spring expands the predetermined amount.

13. The system of claim 12 wherein the locking pin is further positioned to avoid interference with the latch if the temperature is less than the predetermined temperature.

14. The system of claim 11 wherein the cover panel covers the projector proximate a lamp and the temperature comprises the temperature proximate the lamp.

15. The system of claim 11 further comprising an override proximate the thermal safety, the override operable to release the latch if the interior has the predetermined temperature.

* * * * *